(12) United States Patent
Lin et al.

(10) Patent No.: US 12,689,844 B2

(45) Date of Patent: Jul. 21, 2026

(54) SPIKING NEURAL NETWORK ARRANGEMENT FOR ACTIVE SPAD IMAGING

(71) Applicant: ECOLE POLYTECHNIQUE FEDERALE DE LAUSANNE (EPFL), Lausanne (CH)

(72) Inventors: Yang Lin, Neuchatel (CH); Edoardo Charbon, Jouxtens-Mezery (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 90 days.

(21) Appl. No.: 18/969,036

(22) Filed: Dec. 4, 2024

(65) Prior Publication Data

US 2026/0156384 A1     Jun. 4, 2026

(51) Int. Cl.
| | |
|---|---|
| *H04N 25/773* | (2023.01) |
| *G06N 3/049* | (2023.01) |
| *G06N 3/067* | (2006.01) |
| *H04N 23/74* | (2023.01) |
| *H04N 25/78* | (2023.01) |

(52) U.S. Cl.
CPC ........... *H04N 25/773* (2023.01); *G06N 3/049* (2013.01); *G06N 3/067* (2013.01); *H04N 23/74* (2023.01); *H04N 25/78* (2023.01)

(58) Field of Classification Search
CPC ...... H04N 25/773; H04N 23/74; H04N 25/78; G06N 3/049; G06N 3/067
See application file for complete search history.

(56) References Cited

U.S. PATENT DOCUMENTS

| | | | |
|---|---|---|---|
| 2020/0091214 A1* | 3/2020 | Ikeda ...................... | G06N 3/065 |
| 2024/0089636 A1* | 3/2024 | Ashida ................... | H04N 25/77 |
| 2025/0028944 A1* | 1/2025 | Maclean ................ | H03H 11/04 |

OTHER PUBLICATIONS

Wei Wang et al.: "Temporal Pulses Driven Spiking Neural Network for Time and Power Efficient Object Recognition in Autonomous Driving", 2020 25th International Conference on Pattern Recognition (ICPR), pp. 6359-6366, IEEE, 2021.

(Continued)

*Primary Examiner* — Jennifer D Bennett

(74) *Attorney, Agent, or Firm* — Maschoff Brennan

(57) ABSTRACT

A spiking neural network system for single-photon imaging is disclosed. The system comprises: a light source for emitting a series of light pulses, one pulse per repetition period, for repeatedly illuminating one or more objects; a single-photon detector for detecting photons received from the one or more objects; a ring circuit connected to the single-photon detector, the ring circuit comprising a set of delay elements connected to one another thereby forming a ring structure, a respective delay element is configured to store a spike received from the single-photon detector, the ring circuit being configured to repeatedly rotate the spikes through the delay elements, a respective spike making a full rotation of the ring circuit in one rotation period such that the ring circuit is synchronized with the light source; a read-out circuit for reading out the spikes stored in the delay elements while maintaining the differences of arrival times of the spikes in the ring circuit; and a spiking neural network configured to receive the spikes from the read-out circuit to generate an image of the one or more objects.

20 Claims, 7 Drawing Sheets

(56)           References Cited

OTHER PUBLICATIONS

Mst Shamim Ara Shawkat et al.: "A Single Chip SPAD based Vision Sensing System with Integrated Memristive Spiking Neuromorphic Processing", IEEE Access, 11:19441-19457, 2023.

Emre O. Neftci, et al.: "Surrogate Gradient Learning in Spiking Neural Networks: Bringing the Power of Gradient-Based Optimization to Spiking Neural Networks", IEEE Signal Processing Magazine, 36(6):51-63, 2019.

Yang Lin, et al.: "Recurrent Neural Network-Coupled SPAD TCSPC System for Real-Time Fluorescence Lifetime Imaging", arXiv preprint arXiv: 2306.15599, 2023.

Yang Lin, et al.: "Spiking Neural Networks for Active Time-Resolved SPAD Imaging",2024 IEEE/CVF Winter Conference on Applications of Computer Vision (WACV), Jan. 3-8, 2024.

* cited by examiner

| Models | MAPE | | |
| --- | --- | --- | --- |
| | No Noise | 1% Noise | 5% Noise |
| CMM | 0.0507 | 0.0838 | 0.3455 |
| CMM[†] | 0.0507 | 0.0723 | 0.1410 |
| LSTM | 0.0485 | 0.0503 | 0.0555 |
| Transporter SNN | 0.0542 | 0.0591 | 0.0633 |

Table 1. Comparison of performance of the proposed models and benchmarks on fluorescence lifetime estimation. (MAPE) is adopted as the metric. Three levels of background noise are considered. The LSB is 0.05 ns. There are 256 repetitions and 1000 timesteps for each repetition.

[†] CMM with background subtraction, assuming that the background level is known.

Fig. 9

SPIKING NEURAL NETWORK ARRANGEMENT FOR ACTIVE SPAD IMAGING

TECHNICAL FIELD

The present invention relates to a spiking neural network (SNN) system for single-photon imaging. In the embodiments explained below, the system is based on a single-photon avalanche diode (SPAD), which is connected to an SNN through a preprocessing device. The present invention equally relates to an imaging method that can be carried out in the proposed system.

BACKGROUND OF THE INVENTION

SPADs are solid-state photodetectors capable of detecting single photons. In other words, SPADs are able to measure and visualize extremely weak light signals, down to single photons. Low timing jitter has made SPADs a popular technology to measure arrival time of the incident photons with high precision. Due to successful implementation in complementary metal-oxide semiconductor (CMOS) technology, SPADs are highly reproducible and can be manufactured reliably with high levels of miniaturization. CMOS SPADs may be arranged into large arrays for wide-field imaging and, thanks to their digital nature, processing may be added on chip near each pixel. Compared to other single-photon detectors, such as photomultiplier tubes (PMTs), and electron-multiplying charge-coupled devices (EMCCDs), the low cost and high timing resolution of SPADS make them suitable for time-resolved biophotonics applications, such as fluorescence lifetime imaging microscopy (FLIM), and positron emission tomography (PET), but also for machine vision applications, such as light detection and ranging (LiDAR).

In a SPAD, upon arrival of a photon, the avalanche breakdown is triggered within the SPAD, resulting in a pulse at the output voltage. The pulses are counted in passive imaging to obtain intensity information, or they are time-tagged in active imaging to obtain timing information. FIG. 1 demonstrates the conventional workflow of an active time-resolved SPAD time-correlated single-photon counting (TCSPC) imaging system 1. In this kind of traditional SPAD TCSPC system, a laser 2 illuminates an object 3 and sends a reference signal to a time-to-digital converter (TDC) 4. The object 3 reflects or emits light, which is detected by a SPAD 5. Reference pulse signals from the laser 2 and detection pulse signals from the SPAD 5 are directed to the TDC 4 for time-tagging. The timestamps are often histogrammed by a histogram generator 6 and transmitted to a PC 7 for data processing, where an image 8 is reconstructed. Substantial amounts of data are generated in this processing, posing challenges to data transfer, processing, and storage on both hardware and software levels. While artificial neural networks (ANNs) have been utilized to process data generated by SPADs, one further step could be made to integrate spiking neural networks (SNNs) into vision systems, considering that an SNN takes the spike as input. An SNN can be thus directly connected to the SPAD, eliminating time-to-digital converters (TDCs) and histograms, as well as enabling end-to-end learning and inference. Implemented on the SPAD sensor, the SNN-based processing can reduce latency, bandwidth, and power consumption, while realizing real-time and intelligent analysis.

Though, in principle, SNNs can be used to process signals from both active and passive SPAD imaging, they are essentially different tasks. In an active imaging setup, the target is repeatedly illuminated by a laser or photodiode. The information is represented by the difference between the arrival time of the photon and the reference, which is basically phase-coded. In a passive imaging setup, spiking generated by incoming photons is a Poisson process, which is rate-coded. Therefore, from the signal processing perspective, the SPAD sensor is no more than a traditional CMOS sensor except for extreme photosensitivity and high frame rate. The existing algorithms that adopt a Poisson encoder are supposed to work for passive SPAD imaging as well. In the following description, we only focus on active imaging with SPAD sensors.

ANNs take inspiration from neurons and synapses of biological neural networks and have achieved stunning success in the last decade. By introducing the third factor, i.e. temporal dynamics, SNNs are seen to mimic biological neural networks and form a promising model to supersede traditional ANNs. They have been successfully implemented in some vision systems. To construct an SNN, several aspects should be considered, including the encoder, spiking neuron model, network topology, decoder, and/or training methods. Aiming at in-sensor and near-sensor implementation, the four last-mentioned aspects cannot be chosen arbitrarily due to hardware limitations. Dedicated hardware is needed for specific coding schemes and spiking neurons. Training SNN is a challenging problem due to the non-differentiability of the firing function. Most existing methods set constraints on the coding scheme or the firing behavior. ANN-to-SNN conversion assumes rate-based coding while backpropagation through spike time assumes latency coding and often limits the number of firings. Recently, surrogate gradients have emerged as a promising training method that is applicable across various coding schemes.

Despite the difficulty of efficient training, SNNs have been used in several applications. ANNs are transformed into SNNs to reduce energy consumption and running time. SNNs have been used for detectors, such as electroencephalogram (EEG) and event cameras for various applications. The community, however, focuses more on classification than regression, more on still images than sequences, and more on rate-based coding than other coding schemes, while SPAD-based applications are more of phase coding, sequential processing, and regression. Only few studies have been performed on the SNNs for SPAD and other single-photon detectors. In publication by Wei Wang et al., entitled "Temporal Pulses Driven Spiking Neural Network for Time and Power Efficient Object Recognition in Autonomous Driving", 2020 25th International Conference on Pattern Recognition (ICPR), pages 6359-6366, IEEE, 2021, it was first proposed to use SNNs to process single-photon signals. The authors use an SNN to process LiDAR raw data for object detection. However, it is assumed that all the spikes come within one repetition period (i.e., the illumination period of the laser source), which is not applicable to other tasks such as FLIM. Publication by Mst Shamim Ara Shawkat et al., entitled "A Single Chip SPAD based Vision Sensing System with Integrated Memristive Spiking Neuromorphic Processing", IEEE Access, 11:19441-19457, 2023, implemented SNNs with SPAD sensors, but the arrangement only works on handwritten digit recognition with passive imaging simulation data. To this date, there still lacks a general framework for constructing SNNs for active SPAD or other single-photon imaging.

SUMMARY OF THE INVENTION

It is an object of the present invention to overcome at least some of the shortcomings identified above relating to imaging solutions relying on single-photon detection. The present invention thus proposes a new SNN system, which is designed specifically for active time-resolved SPAD imaging. With ring-based hardware, the SNN system folds the time domain across multiple repetition periods. Phase-coded spike trains are converted into density-coded spike trains, reducing the sparsity and length of the spike trains and thus facilitating training and inference processes. Surrogate gradients are utilized to train the SNN used in the system. This framework is evaluated through experimentation on a classic application of SPAD image sensors, namely fluorescence lifetime estimation.

According to a first aspect of the invention, there is provided a spiking neural network system for single-photon imaging as recited in claim 1.

According to a second aspect of the invention, there is provided an imaging method as recited in claim 18.

In some embodiments, the present invention proposes a new SNN framework for active time-resolved SPAD imaging reducing hardware complexity while maintaining comparable or even better performance compared with state-of-the art SPAD imaging solutions. The following description details a simplified leaky integrate-and-fire (LIF) neuron model and its hardware, the encoder and its hardware, and the tailored training scheme. We emphasize the necessity of employing dedicated encoder hardware implemented as a ring circuit or circuitry to convert phase-coded spike trains from SPADs to denser and more informative spike trains for more efficient training and inference and also the necessity of eliminating the TDC on the hardware level to release resources. The performance of the proposed SNN system is demonstrated through testing on synthetic data, exhibiting satisfactory results even with simple topologies, such as two-hidden-layer neural networks.

The dedicated encoder and the SNN can be implemented on the field-programmable gate array (FPGA) and further on the chip to realize near-sensor and in-sensor processing, which could reduce power consumption and latency and allow high throughput processing. 3D stacking technology is envisioned to further improve the performance, making it possible to be migrated to portable devices. In addition to low-level down-stream tasks, the proposed framework may also be used to high-level downstream tasks. Examples of low-level tasks are fluorescence lifetime imaging microscopy (FLIM) and distance estimation in light detection and ranging (LiDAR), whereas examples of high-level downstream tasks include face recognition, object detection, and image segmentation.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which:

FIG. 9 is a table showing performance comparison of the proposed model and benchmarks when applied to fluorescence lifetime estimation.

DETAILED DESCRIPTION OF EMBODIMENTS OF THE INVENTION

Figures 1, 2:
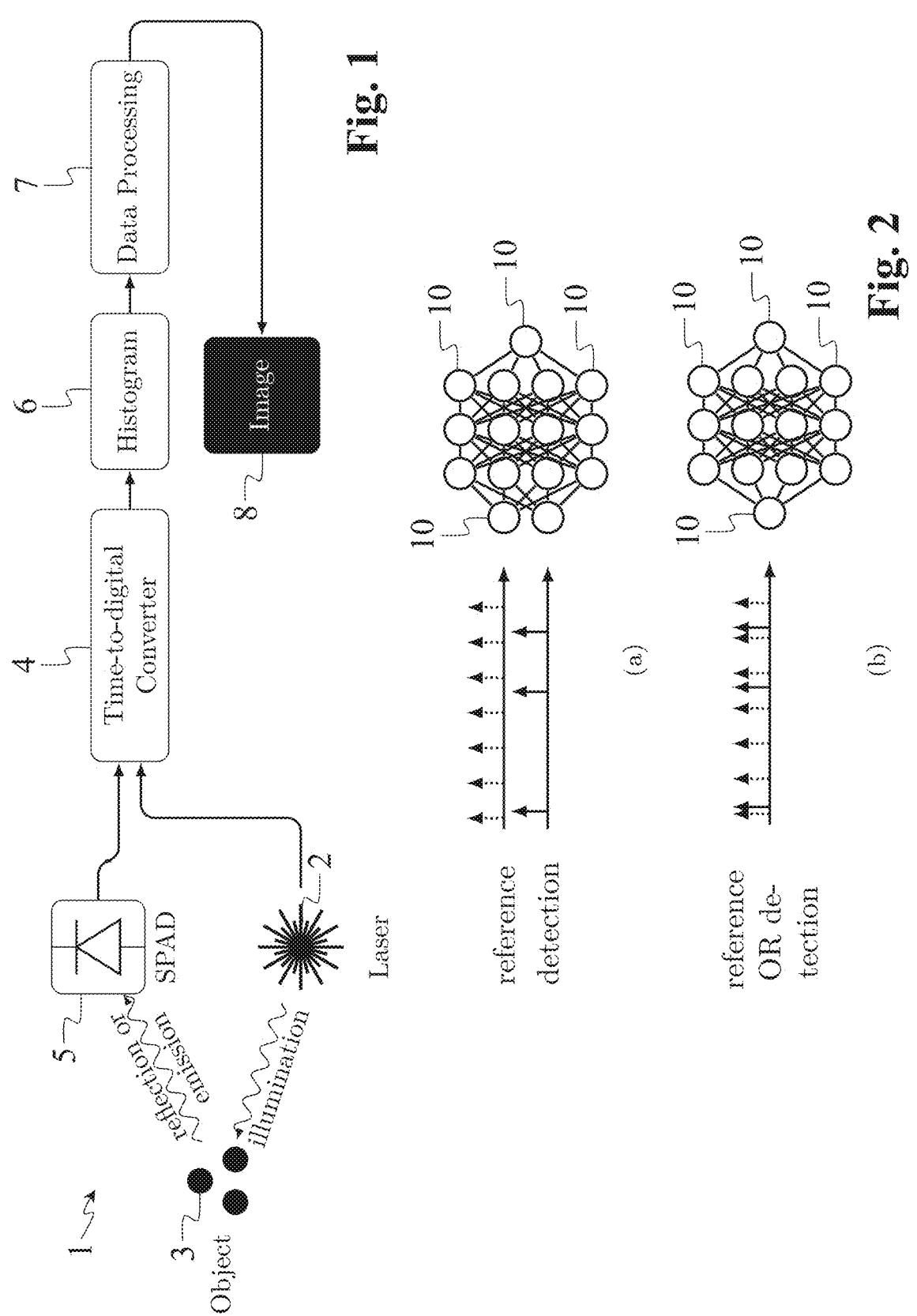
FIG. 1 is a block diagram showing workflow of a traditional SPAD TCSPC system and the SNN-coupled SPAD system.
FIG. 2 illustrates intuitive input coding for single-photon detectors, in scenario a) the SNN has two input nodes, which take the reference signal and the detection signal as input separately, while in scenario b) the SNN has only one input node, which takes the sum of the reference and detection signals as input.

The new SNN system, namely the SNN, which can also be called a transporter SNN, along with a corresponding hardware scheme, for active time-resolved SPAD imaging is explained in more detail in the following. However, single-photon detection according to the present invention is not limited to SPADs. The proposed framework converts phase-coded spike trains into density-coded ones, enabling training with rate surrogate gradient. Toward the end of the present description, the SNN framework is evaluated on fluorescence lifetime imaging. The results demonstrate that the accuracy of shallow SNNs is on par with established benchmarks. Our vision is to integrate SNNs in SPAD sensors, or in other single-photon sensors, and to explore advanced SNNs within the proposed schemes for high-level applications.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." Furthermore, the term "comprise" is used herein as an open-ended term. This means that the object encompasses all the elements listed, but may also include additional, unnamed elements. Thus, the word "comprise" is interpreted by the broader meaning "include", "contain" or "comprehend". Identical or corresponding functional and structural elements which appear in the different drawings are assigned the same reference numerals. It is to be noted that the use of words "first", "second" and "third", etc. may not imply any kind of particular order or hierarchy unless this is explicitly or implicitly made clear in the context.

Before explaining the teachings of the present invention in more detail, the following definitions are given:

Repetition or illumination period in SPAD imaging refers to the time interval between successive light source emissions, in this case laser pulse emissions, used for illuminating the object or sample being imaged. This period is important for timing the detection of emitted photons and for synchronizing the SPAD's response to the incoming light signals. In time-resolved imaging, each pulse from the laser initiates the process of capturing the time it takes for photons to return to the detector after interacting with the sample. The repetition period should be carefully selected to allow sufficient time for the system to reset and be ready for the next pulse while maximizing the signal-to-noise ratio and ensuring effective temporal resolution. This balance can impact the overall performance of the imaging system, including its ability to resolve fast dynamics or capture weak signals. In the present invention, the repetition period may be comprised between 0.01 μs and 100 μs, and more specifically between 0.1 μs and 10 μs.

Repetition frequency in SPAD imaging refers to how often the light source emits pulses within a given time period. It is the inverse of the repetition period, indicating the number of light pulses delivered per unit time.

Timestep in single-photon, such as SPAD, imaging refers to the discrete intervals used to measure the time of arrival of photons detected by the SPAD after a light pulse is emitted. In the context of the present invention, a timestep thus also refers to the time interval during which a data value (in this case a bit value) representing a received photon travels or rotates from one memory unit, also referred to a delay element, to another, subsequent memory unit in a hardware ring circuit, such as in a ring oscillator, as explained later. During the imaging process, after each light pulse, the system records when each photon is detected relative to the time of the pulse. The timestep defines how finely the time is sampled, allowing for precise timing measurements of the photon arrivals. A shorter timestep can improve temporal resolution, enabling the system to capture fast dynamics, while a longer timestep might be sufficient for slower processes but could lead to a loss of detail in timing information. Overall, the choice of timestep influences the achievable temporal resolution and accuracy in the imaging results.

Rotation period refers to the time duration required for a single data value, in this case one-bit value, to make a full rotation of the ring circuit. In other words, one bit value rotates through all the memory units of the ring circuit in a rotation period.

Photon rate in single-photon imaging refers to the number of photons detected per unit time, typically expressed in units such as counts per second or photons per second. This rate is an important parameter as it provides insight into the intensity of the light interacting with the sample and the effectiveness of the imaging setup.

First, a more detailed problem formulation is elaborated in the following paragraphs. SPAD imagers naturally produce spike trains, making them an ideal input for SNNs. Thus, SPADs provide information represented by discrete spikes (or action potentials) rather than continuous signals. A spike train is a sequence of spikes (i.e., discrete time events) that encode information. Unlike event cameras or passive SPAD imagers that primarily encode spikes based on rate, the phase-coded spike input from active SPAD imagers presents a greater challenge for SNNs. While one can select encoding methods and data preprocessing schemes arbitrarily on the PC, the hardware limits such flexibility. Hence, it is important to consider hardware feasibility when choosing the encoding method and data preprocessing scheme.

Straightforwardly, the reference signals, which are the laser pulse signals, and detection signals, which are the signals generated upon detection of an arrival of a photon, can be connected to the SNN 9 directly, or the sum of them, as shown in FIG. 2. More specifically, in scenario (a) in FIG. 2, the SNN has two input nodes, which take the reference signal and the detection signal as input separately. In scenario (b), the SNN has only one input node, which takes the sum of the reference and detection signals as input. It is worth noting that the latter is a special case of the former, as the OR gate can be modeled as a spiking neuron with the same synaptic weights for the reference and detection signals. Nevertheless, this scheme gives rise to two challenges: the ultra-long sequences and the variance in spike density. The topology of scenario (b) is used in the present invention. With a simple topology, the SNN comprises a given number of hidden layers, and only one input neuron node and only one output neuron node. The number of hidden layers in the SNN ranges from one to tens or hundreds, depending on the complexity of the task and the effectiveness of the training. More advanced topology could include more than one input neuron and/or more than one output neuron, and optionally recurrent and convolution networks. In the present embodiments, the SNN comprises one input neuron, one output neuron, and two hidden layers, where the number of artificial neurons per hidden layer preferably decreases toward the output neuron node.

In active time-resolved SPAD imaging, achieving higher temporal resolution is always desirable to enhance precision, resulting in an increased number of timesteps within a repetition period. Besides, hundreds to thousands of photons are typically necessary to construct a comprehensive event picture. Thus, the total timesteps can easily reach the magnitude of millions. In practice, the ratio between photon rate and repetition frequency is kept low to avoid the pile-up effect, which means that there are many repetition periods where no photon is detected. These additional "blank" inputs will further lengthen the already long sequence by several orders of magnitudes. The number of total timesteps is given by $$N = \frac{N_T \times N_C}{\phi}, \tag{1}$$

where $N_T$ is the number of timesteps in one repetition period, $N_C$ is the number of desired photons, and $\phi$ is the ratio between photon rate and repetition frequency. The ultra-long sequence results in inefficiency and excessive computation during the inference and makes it impossible to train the neural network through backpropagation through time (BPTT) due to the gradient exploding/diminishing problem.

The probability of photon reception within a single repetition period varies across pixels and cases, which leads to the variation in the number of "blank" inputs. When employing spiking neuron models with temporal dynamics, such as membrane potential decay and input decay, it would be challenging for the SNN to handle inputs with such a high temporal dynamic range.

In order to implement the SNN 9 for active time-resolved SPAD imaging on hardware, it is important to employ a hardware-feasible encoder to convert the phase-coded spike trains from SPADs to denser and more informative ones, where the "blank" inputs are eliminated, and the encoded information is easier to learn. Tailored training techniques are also required for supervised learning on regression tasks.

The proposed architecture, the neuron model used therein, and the method are explained in the following in more detail. In the present embodiments, leaky integrate-and-fire (LIF) neuron model is adopted to keep the balance of the trade-off between the simplicity and capability of the neural network. However, other neuron models could instead be used, such as integrate-and-fire model, adaptive integrate-and-fire model, or a Hodgkin-Huxley model. Considering that subtraction is easier than multiplication in hardware implementation, we assume that the membrane potential decays linearly instead of exponentially. The membrane potential U of neuron i in layer l at timestep n (which is fundamentally the same timestep as mentioned above) with soft reset is given by:

$$U_i^{(l)}[n] = U_i^{(l)}[n-1] - \tau_{decay}\} \, \text{decay} - V_{thre}S_i^{(l)}[n-1]\} \, \text{reset} + \tag{2}$$
$$\sum_{j=0}^{N_{l-1}} W_j^{(l-1)} S_j^{(l-1)}[n]\} \, \text{input}$$

where $\tau_{decay}$ is the decay constant, $V_{thre}$ is the firing threshold, $N_l$ is the number of neurons in the layer l, w is the synapse weight, and S is the output of spiking neurons. The spiking neuron fires when the membrane potential exceeds the threshold:

$$S_i^{(l)}[n] = \begin{cases} 1, & \text{if } U_i^{(l)}[n] \geq V_{thre} \\ 0, & \text{otherwise} \end{cases} \tag{3}$$

When the hard reset is adopted, the membrane potential $$U_i^{(l)}$$

is simply reset to 0 when it exceeds the threshold. Hard reset is used is used in the present embodiments for the SNN system, but other resetting schemes could instead be used.

Figure 3:
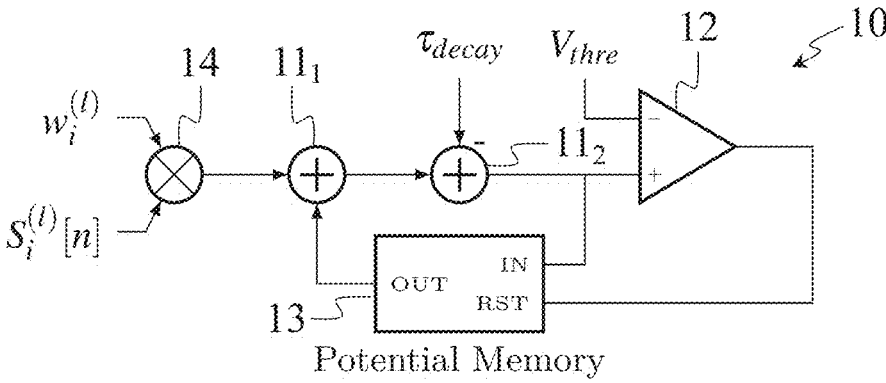
FIG. 3 shows a schematic of the simplified leaky integrate-and-fire (LIF) spiking neuron model.

The simplified LIF model requires minimal hardware resources to implement. As shown in FIG. 3, the necessary electronic building blocks of a neuron 10 are two adders 11$_1$, 11$_2$ for integration and decay, one comparator 12 for firing detection, and one memory 13 for membrane potential storage. A multiplier 14 is also shown for multiplying the synapse weight $$w_i^{(l)}$$

and the spiking neuron output $$S_i^{(l)}[n].$$

In the hardware implementation, the multiplier can be simplified to a look-up table (LUT). In FIG. 3, "IN" refers to an input node or terminal, "OUT" refers to an output node or terminal, and "RST" refers to a reset node or terminal. As is shown in FIG. 3, the comparator output is arranged to reset the potential value stored in the memory 13. The simple structure allows it to be implemented on a large scale on the sensor arrangement.

The spiking neurons and networks may for example be built with SpikingJelly, an open-source deep learning framework for SNN based on PyTorch. To realize the simplified LIF model, the perfect integrate-and-fire model (IF) neuron.IFNode in SpikingJelly is used in this example, and a bias is added along with synaptic weights, serving as a constant current into the IF model. It is worth noting that the bias can be either positive or negative.

Regarding the network topology, the following description explains the proof of concept in more detail, where the SNN 9 uses a two-hidden-layer architecture. However, the present invention is by no means limited to SNN architectures having only two hidden layers, but rather the present invention covers any number of hidden layers in the SNN, and more complex topologies, such as recurrence and convolution topologies may equally be used. Multiple input neurons may optionally be used to take spike trains from multiple pixels or voxels, and the multiple output neurons may also optionally be used to predict multiple properties. In the present non-limiting example, the first and second hidden layers have 256 and 128 neurons, respectively.

It is possible to use various decoders and loss functions in connection with the proposed architecture. This non-limiting example uses a variation of mean square spike rate (MSSR) and mean square membrane (MSM). The mean of the output along timesteps is interpreted as the prediction:

$$\hat{y} = \frac{1}{N_T} \sum_{n=0}^{N_T} y[n], \tag{4}$$

where y denotes the output of the SNN. The output node can be modeled as an IF neuron with an infinite threshold and no leakage, where the prediction $\hat{y}$ is proportional to the membrane potential when $N_T$ is fixed.

Mean absolute percentage error (MAPE) is used as the loss function for the experiment, which is defined as $$\mathcal{L}_{MAPE} = MAPE(y, \hat{y}) = \frac{1}{N_B} \sum_{i}^{N_B} \left| \frac{y_i - \hat{y}_i}{y_i} \right|, \tag{5}$$

where $N_B$ is the batch size and $y_i$ is the label of the sample i. However, common loss functions such as L1 loss and L2 loss can be used as well.

Figure 4:
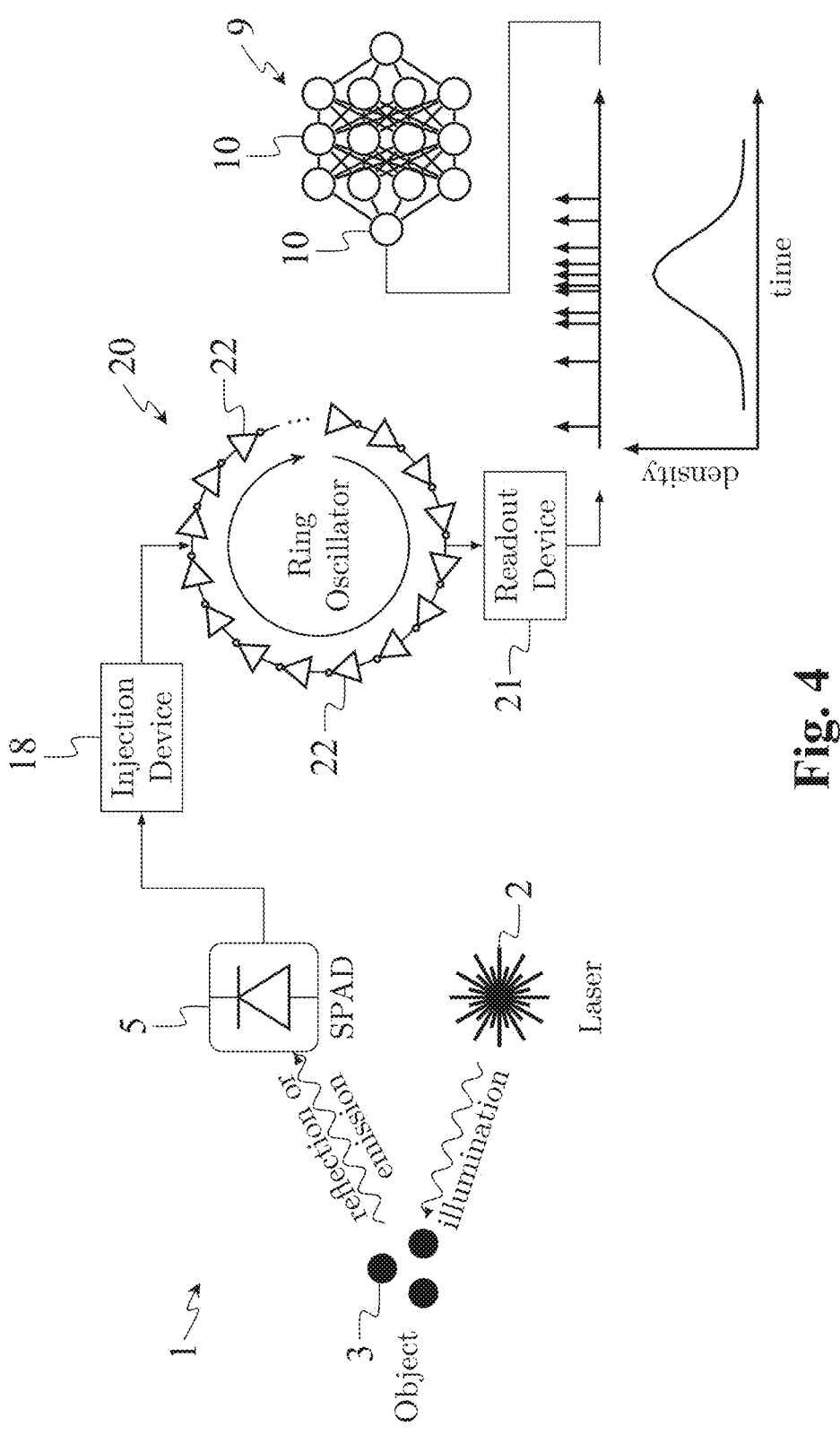
FIG. 4 shows the proposed SNN system according to a first implementation embodiment.

FIG. 4 illustrates the proposed SNN-coupled SPAD imaging system 1 according to the first embodiment of the present invention. One SPAD 5 is provided per pixel or voxel. Furthermore, one SNN-coupled SPAD imaging system 1 is also provided per pixel or voxel unless the SNN comprises more than one input neuron, in which case one SNN would be shared between at least two pixels or voxels. When a photon is detected by the SPAD 5, it undergoes an avalanche breakdown, producing a sharp electrical pulse. This pulse is usually very brief (in the range of picoseconds to nanoseconds) and corresponds to the detection of a single photon. The output pulse or spike indicates that a photon has been detected, and the SPAD may optionally record this event with a timestamp or increment a counter. The pulse height is often fixed because it's a binary response: photon detected (pulse) or no photon detected (no pulse). The photons detected by the SPAD 5, or more broadly by another single-photon detector configured to detect photons received from one or more objects, are in this example fed as spikes into an injection device 18, which injects the generated spikes into a ring circuit, circuitry, or device 20, which in this embodiment is a ring oscillator 20, whose rotation period equals the repetition period of the laser. A ring oscillator is a device composed of logic NOT gates, also referred to as inverters, in a ring, whose output oscillates between two voltage levels, representing "true" or presence of a photon and false or absence of a photon. The inverters are linked in a chain by an electrical connector arrangement and the output of the last inverter is fed back into the first one. The inverters can be considered digital components, and the oscillation process involves digital transitions (logic highs and lows).

When the ring oscillator 20 is synchronized with the laser 2, which is a pulsed laser emitting a series of light pulses, one pulse per illumination or rotation period, for repeatedly illuminating one or more objects 3, the incoming photon arrival times are folded into one spike sequence by the ring oscillator 20, which is read out after the photon acquisition by a readout device 21. The spike density is fundamentally proportional to the histogram, which is an ideal input for an SNN. The injection and readout devices 18, 21 can be some simple circuits, e.g., a set-reset flip-flop circuit in combination with a logic OR gate. They can be implemented in many other ways instead. It is to be noted that the reference signal is not fed into the SNN 9. It is thus assumed that the laser 2 is synchronized with the ring oscillator 20 so that they have the same periods, i.e., the repetition period equals or substantially equals the rotation period. The ring oscillator comprises a plurality of delay elements or inverters 22, which form storage units, arranged in a ring structure. More specifically, the ring oscillator 20 is composed of N delay elements connected to each other in the ring by electrical connectors, and each of them gives a delay of T, which in this case is the timestep, and the laser period is exactly $N_T$. The number of delay elements in the ring circuit is preferably comprised between 50 and 10000, and more specifically between 100 and 1000. With more delay elements, more information can be encoded in the ring, at the cost of higher energy consumption and hardware resource usage.

The proposed ring circuit 20 thus creates a loop to store temporal information in time instead of memory until "rematerialization" for processing. As shown in FIG. 4, the spikes generated by the SPAD 5 are injected into the ring oscillator 20 including the delay elements 22. The injected spikes then start circulating indefinitely until "rematerialization" or retrieved by the readout device 21. It is to be noted that the "temporal" information is not stored in memory in the form of timestamps. The delay elements record the information of the arrival of the photon, while the temporal information is stored as the relative position of them. It typically takes a few picoseconds for a given spike to be displaced from one delay element to the next one along the ring. The ring oscillator 20 is synchronized with the reference signal fed in this case from the ring oscillator 20 to the laser 2, keeping the same period. After running for a given number of periods, for example thousands of periods, the spikes are read out sequentially, where the differences among arrival times are maintained. This means that the ring oscillator 20 is read only once the required information is collected by the SPAD 5 and temporarily stored in the ring oscillator 20. The resulting sequence is exactly the binarized sum of all repetition periods, thus the density of the spikes through time is fundamentally the histogram of photon arrival times. After each read-out operation, the ring oscillator 20 is initialized, i.e., in this case the values of the delay elements are set to zero. It is to be noted that in this example, the delay elements 22 are configured to store binary information, i.e., information about detection or non-detection of a photon by the SPAD 5.

The total number of timesteps is reduced by the proposed arrangement by several orders of magnitude, significantly improving the efficiency and facilitating the training. Since the delay element 22 can only store binary information (i.e., the information is stored as a logic low or logic high), several spikes falling into the same delay element can cause information loss and distortion. Thus, one has to balance the trade-off between hardware implementation difficulty and information fidelity in practice.

Figure 5:
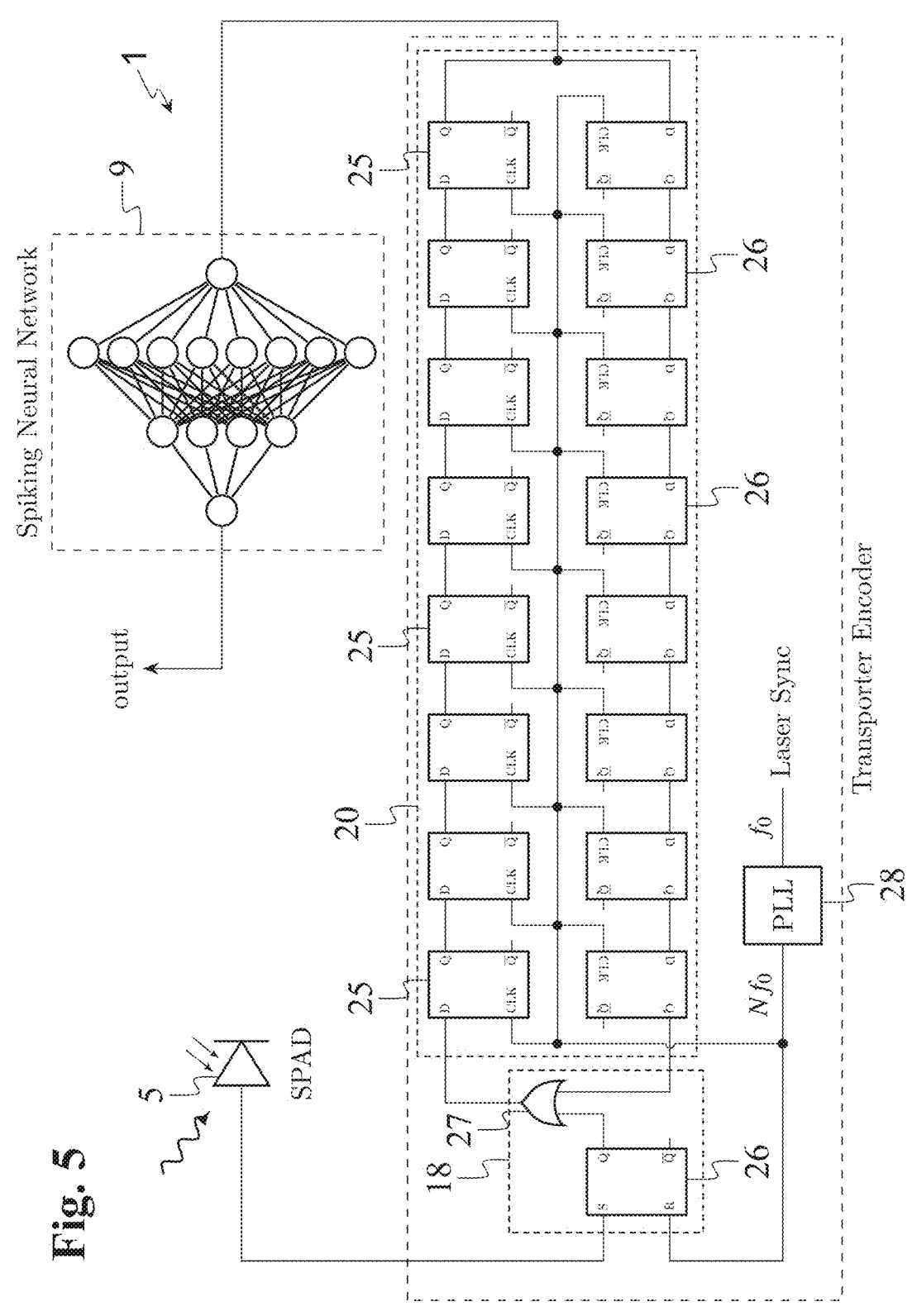
FIG. 5 shows the proposed SNN system according to a second implementation embodiment.

FIG. 5 illustrates the proposed SNN-coupled SPAD imaging system 1 according to the second embodiment of the present invention. It is to be noted that the read-out circuit is in this figure omitted for simplicity. The structure and operation of the system according to the second embodiment are similar to the ones of the first embodiment with the main difference that in the second embodiment, the ring circuit 20 is a flip-flop circuit arrangement as opposed to being a ring oscillator. More specifically, the flip-flop circuit arrangement includes a plurality of D-type flip-flop circuits 25 forming delay elements and arranged in a ring structure. As shown, the injection device 18 is in this case composed of a set-reset flip-flop circuit 26 and a logic OR gate 27. The same injection circuit structure can be used in the system according to the first embodiment. In FIG. 5, S denotes set, R denotes reset, Q denotes output, $\overline{Q}$ denotes inverse of output, D denotes input, and CLK denotes clock. As is further shown in FIG. 5, "Laser Sync" is the signal from the pulsed laser 2 (not shown in FIG. 5), and $f_0$ is the frequency of the "Laser Sync" signal, which is the input of a phase-locked loop (PLL) 28. The PLL divides the frequency by N and the output is the signal with the frequency of $Nf_0$. Also in this embodiment, the spike data stored in the flip-flop circuits 25 rotate around the ring circuit 20 such that the data rotation period equals the repetition period.

According a third embodiment, which is not illustrated in the figures, the ring circuit 20 could be implemented as a dynamic random-access memory (DRAM). The DRAM would store each bit of data (in this case indication of photon detection or non-detection) in a memory cell, usually consisting of a tiny capacitor and a transistor, both typically based on metal-oxide-semiconductor (MOS) technology. While most DRAM memory cell designs use a capacitor and transistor, it would be possible to use only use two transistors instead. It is to be noted that there is a synchronization between the ring circuit 20 and the laser 20 in all the embodiments described in the present description, but its implementation may differ. In the first embodiment, it is the ring circuit 20 that drives the laser 2, while in the second third embodiments, it is the light source 2 that drives the ring circuit 20. Furthermore, in the second and third embodiments, instead of the synchronization or reference signal coming from the light source, it could be an external signal, such as a signal from an external clock that would be fed into light source and the ring circuit to mutually synchronize these elements.

The present invention thus proposes a spiking neural network system for single-photon imaging as explained above. The system comprises:

a light source for emitting a series of light pulses, one pulse per repetition period, for repeatedly illuminating one or more objects;

a single-photon detector for detecting photons received from the one or more objects;

a ring circuit directly or indirectly electrically connected to the single-photon detector, the ring circuit comprising a set of delay elements connected to one another by an electrical connector arrangement thereby forming a ring structure, a respective delay element is configured to store, in this case temporarily, a data representation of a respective detected photon, referred to as a spike, directly or indirectly received from the single-photon detector, the ring circuit being configured to repeatedly rotate the spikes through the delay elements of the ring circuit, a respective spike making a full rotation of the ring circuit in one rotation period, the duration or length of which equals or substantially equals the duration or length of the repetition period;

a read-out circuit for reading out the spikes stored in the delay elements while maintaining the differences of arrival times of the spikes in the ring circuit; and a spiking neural network configured to receive the spikes from the read-out circuit to generate an image of the one or more objects as a response to receiving the spikes from the read-out circuit.

The durations of the repetition period and the rotation period thus have a predefined relationship. In the embodiments described herein, this relationship is such that these two durations are mutually of equal length.

The SNN 9 is in this example trained with surrogate gradient, for example according to the teachings of publication by Emre O. Neftci, et al., "Surrogate Gradient Learning in Spiking Neural Networks: Bringing the Power of Gradient-Based Optimization to Spiking Neural Networks" IEEE Signal Processing Magazine, 36 (6): 51-63, 2019. With the folding of the time domain by the ring circuit 20, millions of timesteps of the sequence are compressed into thousands to tens of thousands of timesteps, which makes it possible to train the SNN with BPTT.

Surrogate gradient smoothens the SNN 9 and helps the gradients "flow" backward during BPTT. The firing function (Equation 3) is non-differentiable at $U=V_{thre}$ and has derivatives of 0s elsewhere, which makes it impossible to use BPTT directly. To overcome this, the non-differentiable firing function is replaced by a differentiable surrogate function, e.g. Sigmoid and arctan functions, in the backward path. Arctan is used here for the training:

$$S(U) = \frac{1}{\pi}\arctan\left(\frac{\pi}{2}\alpha(U - V_{thre})\right) + \frac{1}{2}, \qquad (6)$$

where $\alpha$ is a scaler. Its derivative is given by:

$$\frac{\partial S}{\partial U} = \frac{\alpha}{2\left(1 + \left(\frac{\pi}{2}(U - V_{thre})\right)^2\right)}, \qquad (7)$$

which is everywhere defined, continuous, and non-zero. OS/OU reaches the maximum at $U=V_{thre}$.

Figure 6:
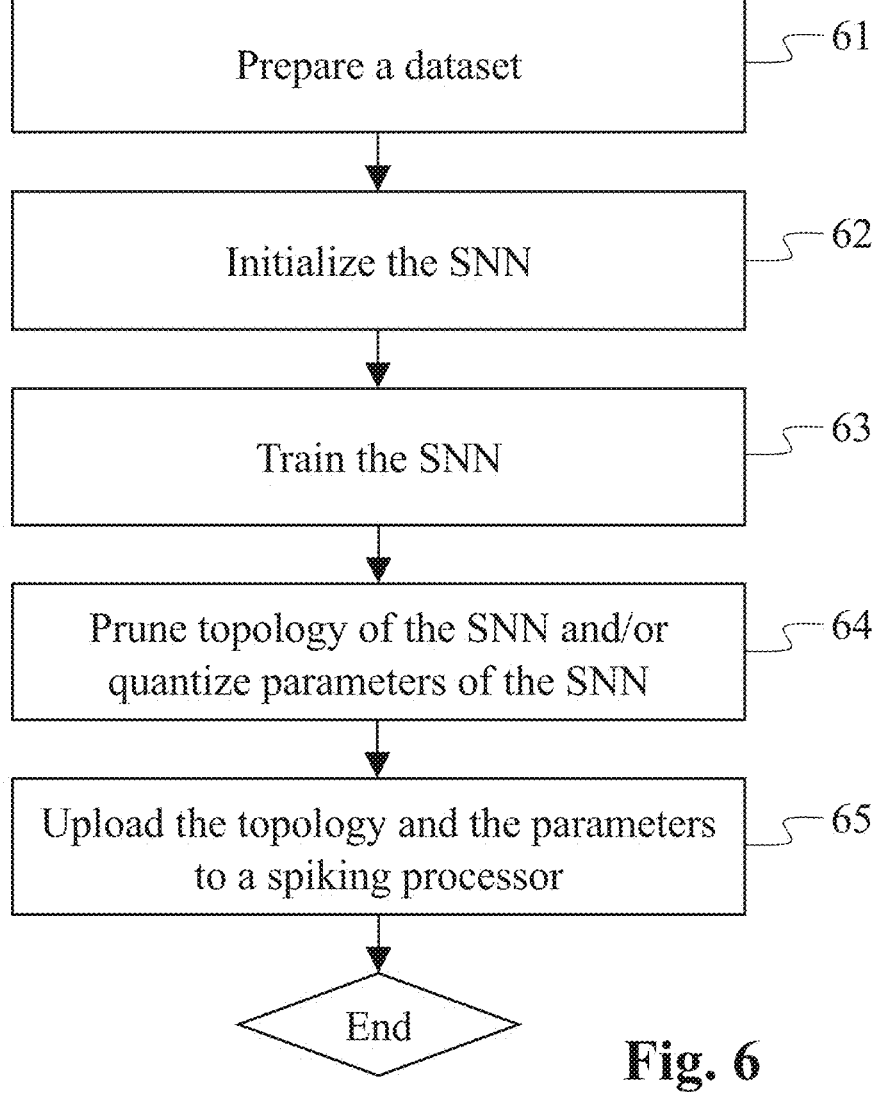
FIG. 6 is a first flowchart summarizing the process of preparing parameters of the SNN used in the system.

The flowchart of FIG. 6 summarizes the process of initializing and training the SNN 9. In step 61, a dataset is prepared to train the SNN 9. More specifically, to train a spiking neural network, a dataset for a specific task, such as fluorescence lifetime imaging microscopy, needs to be collected. Then in step 62, the SNN 9 is defined or initialized. In other words, for example a neuron model, depth and width of the network layers are defined and parameters, i.e. synapse weights are initialized. In step 63, the SNN is trained on the dataset with surrogate gradients and BPTT. This means that the parameters of the SNN 9 are updated so that it can perform a specific task. After the training, in step 64, the topology of the SNN 9 can be further pruned and the parameters can be quantized to reduce the resources of hardware implementation. In the end, in step 65, the topology and the parameters of the SNN are uploaded to an on-chip/FPGA spiking processor, which is the hardware implementation of the SNN 9.

Figure 7:
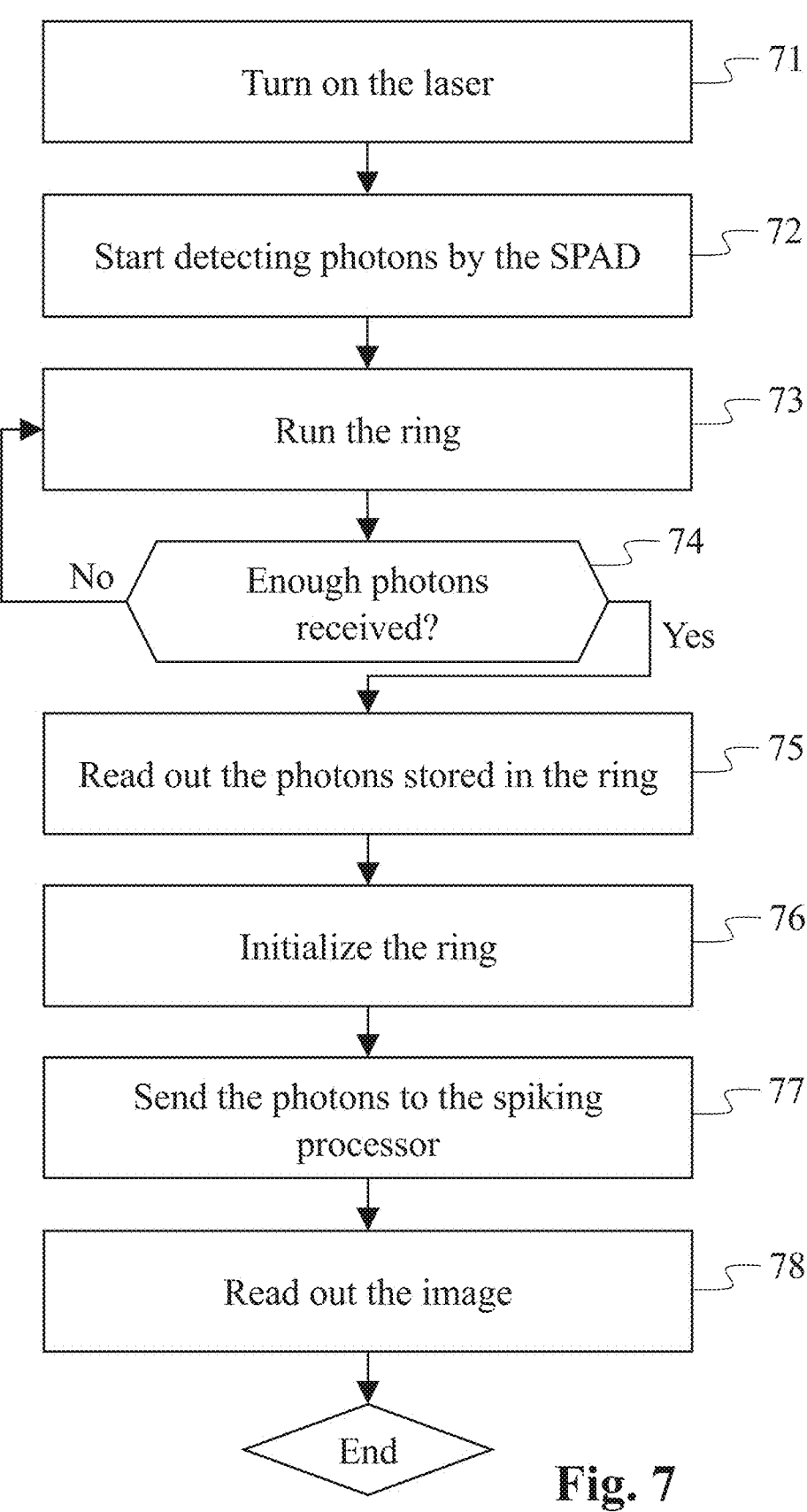
FIG. 7 is a second flowchart summarizing the proposed imaging method according to an example embodiment of the present invention.

The flowchart of FIG. 7 summarizes the proposed imaging method according to an example embodiment of the present invention. In step 71, the laser 2 is turned on. This means that the laser is configured to repeatedly illuminate the object 3. The illumination cycle is defined by the repetition period. In step 72, the SPAD 5 starts detecting and counting photons emitted by the object 3. The resulting spikes or their (digital) data representations are fed to the injection device 18, which injects the spikes (one spike per photon) to the ring circuit 20. It is to be noted that typically zero or one photons are detected by the SPAD per one laser illumination. In step 73, the spikes are stored in the delay elements 22 of the ring circuit 20 while at the same time repeatedly rotating the stored values through the delay elements of the ring circuit. As the object in this example undergoes a dynamic process, the time of arrival of the photons at the SPAD measured from the respective laser illumination instant varies from one laser illumination to another. This means that the photons or their spike representations as stored at any time instant are distributed over different delay elements 22 along the ring circumference thereby forming a photon or spike pattern. However, it may happen that the delay element 22 where the incoming spike is to be stored is already occupied by a spike received earlier. In this event, the new incoming spike overwrites the old spike stored in that delay element 22.

In step 74, it is determined whether or not enough photons have been received or detected by the SPAD. This can be done by determining whether or not the number of the detected photons exceeds a pre-defined threshold for the number of photons. Alternatively, in step 74, it can be determined whether or not enough time has elapsed since last read-out operation or since the laser 2 was turned on. If not enough photons have been received or detected, then in step 73, the ring is kept running, i.e. the values stored in the delay elements are kept in rotation. On the other hand, if it is determined that enough photons have been detected by the SPAD, then the process continues in step 75, where the read-out circuit 21 reads out the values stored in the delay elements. Now the read-out circuit 21 also detects the pattern formed in the ring circuit, where some or most of the delay elements are occupied, while the remaining delay elements are empty. At this stage, the rotation of the values in the ring circuit 20 may be stopped. In step 76, the delay elements 22 are initialized. More specifically, in this case the values of the delay elements 22 are set to zero. In step 77, the spikes read from the ring circuit 20 are fed into the SNN 9 or to its physical implementation, namely the spiking processor. In step 78, an image is read from the SNN 9 or the spiking processor. Now, the process comes to an end, or the above process can be repeated for a new image.

Experiments are analyzed in the following. For data acquisition, synthetic datasets, i.e. simulated datasets, are created for training and evaluation. The modeling of fluorescence is described in publication by Yang Lin, et al., "Recurrent Neural Network-Coupled SPAD TCSPC System for Real-Time Fluorescence Lifetime Imaging", arXiv preprint arXiv: 2306.15599, 2023. Fluorescence, instrument response, background noise, and dark counts are taken into account. Timestamps are generated through the Monte Carlo simulation and are transformed into spike trains. The fluorescence lifetime ranges from 1 ns to 6 ns. Three background noise levels (including dark counts) are considered, which are 0, 1%, and 5%. The center of the instrument response is at 1.968 ns. Other parameters are kept the same as in the above publication by Yang Lin et al.

Figure 8:
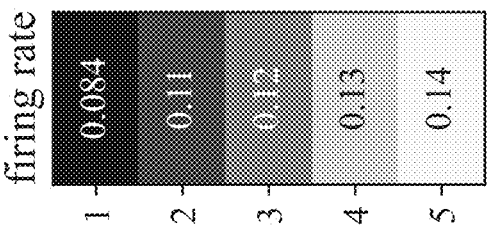
FIG. 8 shows examples of encoding the spike trains used in the system, in particular spike trains for fluorescence TCSPC data with different lifetimes.
Figure 8:
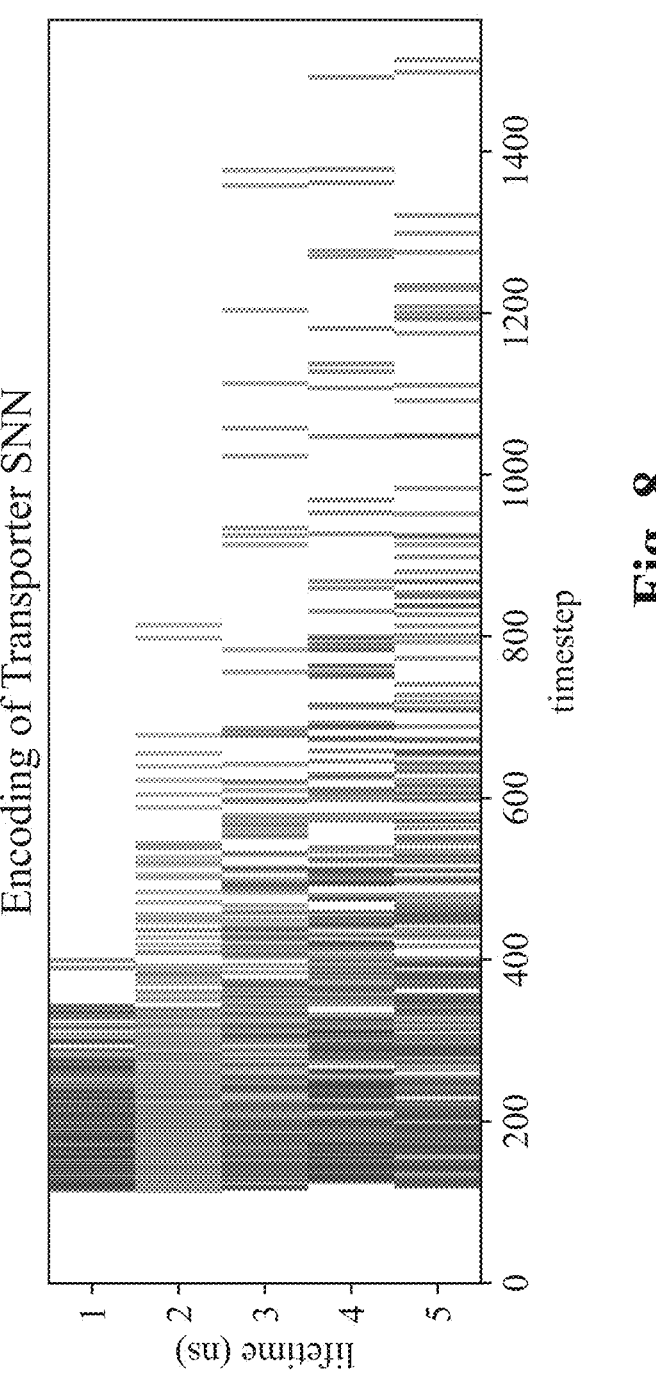

The timestamps are transformed into density-coded spike trains for the SNN 9. Examples of these spike trains are illustrated in FIG. 8, which thus shows examples of the encoding of the proposed SNN 9. Spike trains for fluorescence TCSPC data with different lifetimes are shown here. The least significant bit (LSB) is 0.016 ns, and no background noise is considered. The shift and full width at half maximum (FWHM) of the instrument response function (IRF) are 1.968 ns and 0.1673 ns, respectively. The repetition period is 25 ns. In FIG. 8, each line corresponds to a different molecule under examination, and the firing rate indicates the percentage of 1s or spikes or pulses in the ring circuit 20. The firing rates are visually illustrated on a heat map. When constructing the synthetic dataset for the training of the SNN, it is assumed that the temporal resolution is 0.05 ns, the repetition period is 50 ns (equivalent to a 20 MHz laser), and 256 spikes are found in each sequence.

Experimental data from the above publication by Yang Lin et al. is utilized to evaluate the performance of the SNN system 1 on real-world data, which contains the TCSPC data of a fluorescence lifetime-encoded beads sample. Random distributions are generated from the histograms, from which the timestamps are sampled to ensure that it has the same form as the training set.

The SNN 9 is trained with surrogate gradient. Arctan with α=2 is used as the surrogate function. Since we are training on synthetic data, the training set can be generated for each batch to avoid overfitting. The batch size is 32 and the SNN is trained on 200,000 batches. Adam optimizer is used with an initial learning rate of 0.001, which is halved every 10,000 batches. The training took 38 min on a workstation of AMD Ryzen Threadripper PRO 3945WX and NVIDIA RTX A4500.

The SNN 9 (called transporter SNN in FIG. 9), as well as benchmarks including center-of-mass method (CMM) and long short-term memory (LSTM), are evaluated on the synthetic data. All the methods are tested on a dataset comprising 100,000 samples. MAPE (Equation 5) is adopted as the metric. The result is shown in the table of FIG. 9.

The CMM, although initially effective in noise-free environments, experiences a significant decline in performance when faced with even minor background noise, even when utilizing background subtraction. LSTM demonstrates superior performance across all scenarios. Despite its inferior performance compared to the CMM in noise-free conditions, the SNN 9 surpasses the CMM by a substantial margin when confronted with background noise. It is important to highlight that the SNN 9 possesses a remarkably simple structure, and its performance is expected to be enhanced by using more complex topologies.

The method steps described above may be carried out by suitable circuits or circuitry when the process is implemented in hardware or using hardware for individual steps. However, the method or at least some of the method steps may also or instead be implemented in software. Thus, at least some of the method steps can be considered as computer-implemented steps. The terms "circuits" and "circuitry" refer to physical electronic components or modules (e.g., hardware), and any software and/or firmware ("code") that may configure the hardware, be executed by the hardware, and or otherwise be associated with the hardware. The circuits may thus be operable (i.e., configured) to carry out or they comprise means for carrying out the required method steps as described above. Different computations may or may not be in-sensor operations depending on the implementation.

While the invention has been illustrated and described in detail in the drawings and foregoing description, such illustration and description are to be considered illustrative or exemplary and not restrictive, the invention being not limited to the disclosed embodiments. Other embodiments and variants are understood and can be achieved by those skilled in the art when carrying out the claimed invention, based on a study of the drawings, the disclosure and the appended claims. Further variants may be obtained by combining the teachings of any of the examples explained above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A spiking neural network system for single-photon imaging, the system comprising:
   a light source for emitting a series of light pulses, one pulse per repetition period, for repeatedly illuminating one or more objects;
   a single-photon detector for detecting photons received from the one or more objects;
   a ring circuit directly or indirectly connected to the single-photon detector, the ring circuit comprising a set of delay elements connected to one another by a connector arrangement thereby forming a ring structure, a respective delay element is configured to store a data representation of a respective detected photon, referred to as a spike, received from the single-photon detector, the ring circuit being configured to repeatedly rotate the spikes through the delay elements of the ring circuit, a respective spike making a full rotation of the ring circuit in one rotation period such that the ring circuit is synchronized with the light source;
   a read-out circuit for reading out the spikes stored in the delay elements while maintaining the differences of arrival times of the spikes in the ring circuit; and
   a spiking neural network configured to receive the spikes from the read-out circuit to generate an image of the one or more objects as a response to receiving the spikes forming a spike train from the read-out circuit.

2. The system according to claim 1, wherein the single-photon detector is a single-photon avalanche diode.

3. The system according to claim 1, wherein the read-out circuit is configured to sequentially read out the spikes stored in the delay elements.

4. The system according to claim 1, wherein the read-out circuit is configured to read out the spikes only after a given number of photons have been detected by the single-photon detector or after a given time has elapsed since turning on the light source or since the last read-out operation.

5. The system according to claim 1, wherein the ring circuit is a ring oscillator, a dynamic random-access memory, or a flip-flop circuit arrangement, and wherein the flip-flop circuit arrangement optionally comprises a series of D-type flip-flop circuits in a ring structure.

6. The system according to claim 1, wherein the ring circuit is synchronized with the light source such that the length of the repetition period equals or substantially equals the length of the rotation period.

7. The system according to claim 1, wherein the ring circuit is configured to receive a synchronization signal from the light source, or the light source is configured to receive a synchronization signal from the ring circuit to keep the light source and the ring circuit mutually synchronized, or the light source and the ring circuit are configured to receive an external synchronization signal.

8. The system according to claim 1, wherein the system further comprises an injection device placed between the single-photon detector and the ring circuit for injecting the spikes generated by the single-photon detector in response to photon detections into the ring circuit.

9. The system according to claim 1, wherein the number of delay elements in the ring circuit is comprised between 50 and 10000, and more specifically between 100 and 1000.

10. The system according to any claim 1, wherein the spiking neural network comprises a given number of hidden layers, and only one input neuron node and only one output neuron node, or wherein the spiking neural network comprises a given number of hidden layers, and at least two one input neuron nodes and/or at least two output neuron nodes, or wherein the spiking neural network is a convolutional neural network or a recurrent neural network.

11. The system according to claim 10, wherein the number of hidden layers in the spiking neural network is comprised between 1 and 20, and more specifically between 1 and 10.

12. The system according to claim 10, wherein the number of artificial neurons per hidden layer decreases toward the output neuron node.

13. The system according to claim 1, wherein the spiking neural network adopts an integrate-and-fire model, a leaky integrate-and-fire model, adaptive integrate-and-fire model, or a Hodgkin-Huxley model.

14. The system according to claim 1, wherein a respective delay element is configured to store one spike only as a logic low or logic high.

15. The system according to claim 1, wherein the repetition period is comprised between 0.01 μs and 100 μs, and more specifically between 0.1 μs and 10 μs.

16. The system according to claim 1, wherein the one or more objects are arranged to undergo a dynamic process.

17. The system according to claim 1, wherein the spiking neural network is trainable with surrogate gradient.

18. An imaging method for generating an image of one or more objects by using a spiking neural network system for single-photon imaging, the method comprising:

emitting by using a light source a series of light pulses, one pulse per repetition period, for repeatedly illuminating one or more objects;

detecting by a single-photon detector photons received from the one or more objects;

feeding by the single-photon detector or by an injection circuit the detected photons to a ring circuit directly or indirectly connected to the single-photon detector, the ring circuit comprising a set of delay elements connected to one another by a connector arrangement thereby forming a ring structure, a respective delay element is configured to store a data representation of a respective detected photon, referred to as a spike, received from the single-photon detector;

repeatedly rotating by the ring circuit the spikes through the delay elements of the ring circuit, a respective spike making a full rotation of the ring circuit in one rotation period such that the ring circuit is synchronized with the light source;

reading out by a read-out circuit the spikes stored in the delay elements while maintaining the differences of arrival times of the spikes in the ring circuit; and receiving by a spiking neural network the spikes from the read-out circuit, and generating an image of the one or more objects as a response to receiving the spikes from the read-out circuit.

19. The method according to claim 18, wherein the method further comprises initializing the delay elements once the delay elements have been read out.

20. The method according to claim 18, wherein the method further comprises, prior to operating the spiking neural network to generate the image, training the spiking neural network with surrogate gradient.

* * * * *